US010836198B2

(12) United States Patent
Scholz et al.

(10) Patent No.: US 10,836,198 B2
(45) Date of Patent: Nov. 17, 2020

(54) SECURING THE AUTHENTICITY OF VALUE DOCUMENTS BY MEANS OF CHARACTERISTIC SUBSTANCES

(71) Applicant: GIESECKE & DEVRIENT GMBH, Munich (DE)

(72) Inventors: Ulrich Scholz, Buchbach (DE); Gregor Grauvogl, Oberhaching (DE)

(73) Assignee: GIESECKE+DEVRIENT CURRENCY TECHNOLOGY GMBH, Munich (DE)

(*) Notice: Subject to any disclaimer, the term of this patent is extended or adjusted under 35 U.S.C. 154(b) by 0 days.

(21) Appl. No.: 15/297,563

(22) Filed: Oct. 19, 2016

(65) Prior Publication Data

US 2017/0036477 A1 Feb. 9, 2017

Related U.S. Application Data

(63) Continuation of application No. 12/083,157, filed as application No. PCT/EP2006/009603 on Oct. 4, 2006, now abandoned.

(30) Foreign Application Priority Data

Oct. 5, 2005 (DE) ........................ 10 2005 047 609

(51) Int. Cl.
*B32B 5/16* (2006.01)
*B42D 25/29* (2014.01)
*B42D 25/387* (2014.01)
*B42D 25/369* (2014.01)
*B42D 25/382* (2014.01)
*D21H 21/48* (2006.01)

(52) U.S. Cl.
CPC ........... *B42D 25/29* (2014.10); *B42D 25/369* (2014.10); *B42D 25/382* (2014.10); *B42D 25/387* (2014.10); *D21H 21/48* (2013.01); *Y10T 428/24835* (2015.01); *Y10T 428/25* (2015.01); *Y10T 428/2927* (2015.01); *Y10T 428/2991* (2015.01)

(58) Field of Classification Search
CPC ....... B82Y 30/00; C09C 3/00; C01P 2004/61; C01P 2004/62; C01P 2004/64; C01P 2006/60
See application file for complete search history.

(56) References Cited

U.S. PATENT DOCUMENTS 4,152,483 A 5/1979 Kanda et al.
4,172,920 A 10/1979 Kanda et al.
4,442,170 A 4/1984 Kaule et al.
4,451,530 A * 5/1984 Kaule .................... B41M 3/144 101/DIG. 46
4,533,244 A 8/1985 Kaule et al.
4,567,370 A * 1/1986 Falls ...................... G01N 21/64 250/461.1
4,791,449 A * 12/1988 Foley ....................... G03C 5/08 283/902
4,897,300 A * 1/1990 Boehm .................... G07D 7/12 428/195.1
6,268,222 B1 7/2001 Chandler et al.
6,503,603 B1 1/2003 Kaule et al.
6,506,476 B1 1/2003 Kaule et al.
6,773,812 B2 8/2004 Chandler et al.
6,815,064 B2 11/2004 Treadway et al.
6,913,787 B2 7/2005 Igarashi et al.
7,449,516 B2 11/2008 Bayer et al.
7,579,079 B2 8/2009 Huber
7,698,642 B1 4/2010 Sarin
2003/0198738 A1 10/2003 Tian
2004/0082715 A1 4/2004 Bayer et al.
2004/0245647 A1 12/2004 Perlo et al.
2005/0031838 A1* 2/2005 Lagunowich .......... B41M 3/144 428/211.1
2005/0156318 A1 7/2005 Douglas
2005/0214536 A1 9/2005 Schrier et al.
2006/0155007 A1 7/2006 Huber
2006/0255715 A1 11/2006 Mao et al.
(Continued)

FOREIGN PATENT DOCUMENTS

CN 1192881 C 3/2005
DE 10228186 A1 1/2004
(Continued)

OTHER PUBLICATIONS

Sung et al., Size dependence of the photo-and Cathodo-luminescence of Y2O2S:Eu Phosphors, bull. Korean Chem. Soc. 2006, vol. 27, No. 6. (Year: 2006).*
(Continued)

*Primary Examiner* — Hoa (Holly) Le
(74) *Attorney, Agent, or Firm* — Workman Nydegger

(57) ABSTRACT

A feature substance is provided for securing the authenticity of documents of value, having at least one luminescent substance in particle form and nanoparticles enveloping the surfaces of the luminescent substance particles at least partially, wherein the properties of the feature substance result from the interaction of the properties of the luminescent substance and of the nanoparticles. The invention furthermore relates to a method for producing the feature substance, a method for securing the authenticity of a security element or document of value using a feature substance, as well as security elements and documents of value with authenticity features on the basis of the feature substance.

28 Claims, No Drawings

(56) References Cited

U.S. PATENT DOCUMENTS

| | | | | |
|---|---|---|---|---|
| 2006/0283701 | A1 | 12/2006 | Li et al. | |
| 2007/0005412 | A1* | 1/2007 | Martinez | G06Q 10/06 715/846 |
| 2007/0166534 | A1 | 7/2007 | Entenmann et al. | |
| 2007/0273141 | A1* | 11/2007 | Schwenk | B41M 3/144 283/72 |
| 2008/0249210 | A1 | 10/2008 | Entenmann et al. | |

FOREIGN PATENT DOCUMENTS

| | | | | | |
|---|---|---|---|---|---|
| DE | 69907630 | T2 | | 2/2004 | |
| DE | 10248870 | A1 | | 4/2004 | |
| JP | S5378986 | A | | 7/1978 | |
| JP | S5347303 | B2 | | 12/1978 | |
| JP | S5422326 | B2 | | 8/1979 | |
| JP | S5444275 | B2 | | 12/1979 | |
| JP | S57500919 | A | | 5/1982 | |
| JP | S57500923 | A | | 5/1982 | |
| JP | S5827832 | B2 | | 6/1983 | |
| JP | S5925874 | A | | 2/1984 | |
| JP | S6041106 | B2 | | 9/1985 | |
| JP | 2000204368 | A | | 7/2000 | |
| JP | 2002544365 | A | | 12/2002 | |
| JP | 2005036112 | A | | 2/2005 | |
| RU | 2004116339 | A | | 3/2005 | |
| WO | 8103508 | A1 | | 12/1981 | |
| WO | WO-8103508 | A1 | * | 12/1981 | G07D 7/121 |
| WO | 02098995 | A2 | | 12/2002 | |
| WO | 2005056696 | A2 | | 6/2005 | |

OTHER PUBLICATIONS

Wheeler et al, Nanostructured hematite: synthesis, characterization, charge carrier dynamics, and photoelectrochemical properties, Energy Environ. Sci., 2012, 5, 6682 (Year: 2012).*

German Search Report from corresponding German Application No. DE10 2005 047 609.0, dated Feb. 9, 2006.

International Search Report from corresponding PCT Application No. PCT/EP2006/009603, dated Jan. 18, 2007.

English Language Translation of Japanese Patent Office communication dated Jun. 12, 2012 in related JP Application No. 2008-533930 (5 pages).

Search Report from corresponding DE Application No. 102205047609.0, dated Feb. 9, 2006.

Office Action from corresponding CN Application No. 2006800433478, dated Nov. 20, 2009.

Office Action from corresponding RU Application No. 2008117080/08, dated Aug. 25, 2010.

Office Action from corresponding CA Application No. 2624515, dated Jul. 3, 2012.

Office Action from corresponding CA Application No. 2624515, dated Jun. 12, 2014.

Office Action from corresponding JP Application No. 2008-533930, dated Jul. 9, 2014.

Office Action from corresponding IN Application No. 1354/KOLNP/2008, dated Jul. 30, 2016.

* cited by examiner

SECURING THE AUTHENTICITY OF VALUE DOCUMENTS BY MEANS OF CHARACTERISTIC SUBSTANCES

BACKGROUND

A. Field

The invention relates to feature substances for securing the authenticity of documents of value, methods for their production, security elements and documents of value containing the inventive feature substance, as well as methods for securing the authenticity of security elements and documents of value using the inventive feature substance. The inventive feature substances contain both at least one luminescent substance and at least one further substance, which is preferably magnetic or electrically conductive.

B. Related Art

Security elements in the sense of the present invention are elements with authenticity features applied on or integrated in a document of value for the purpose of securing authenticity. Documents of value within the framework of the invention are objects such as bank notes, checks, shares, tokens, identity cards, passports, credit cards, certificates and other documents, labels, seals, and objects to be secured, such as for example CDs, packages and similar. The preferred field of application is bank notes.

Securing the authenticity of documents of value by means of luminescent substances has been known for a long time. Preferably host lattices doped with rare earth metals are used, wherein through a suitable adjustment of rare earth metal and host lattice the absorption spectrum and the emission spectrum can be varied within a large range. Also the use of magnetic and electrically conductive materials for securing authenticity is known per se. Magnetism, electrical conductivity and luminescence emission are machine-detectable by commercially available measuring devices, luminescence in the case of emission in the visible spectrum is also visually detectable, provided that the intensity is sufficient.

The problem that the authenticity features of the documents of value are counterfeited is practically as old as the securing of authenticity of documents of value. The falsification security can for example be enhanced by not only using one feature substance, but several feature substances in combination, for example a luminescent substance and a magnetic substance, or a luminescent substance and a substance influencing the luminescent properties.

If several feature substances are to be used in combination, the only possibility so far was to either produce a physical mixture of the substances and to apply the mixture on the surface of the document of value or to integrate it in the volume of the document of value, or to apply the feature substances separately. The separate application of the feature substances in two or more steps is time-consuming and cumbersome. Combinations of feature substances are therefore used primarily as mixtures. For producing the mixtures first the individual feature substances are produced separately, then the finished feature substances are mixed together, usually in a dry state. In the physical mixture thus produced the particles of the individual feature substances are in contact with each other, but usually do not enter into any specific interactions with each other, i. e. the feature substances can be separated from each other again intentionally or unintentionally. The individual feature substances are not associated with each other in such a fashion that a product is created which can no longer be separated into its individual components.

These mixtures have the disadvantage that during their manufacturing process and application process a more or less strong segregation can occur, leading to security features with differing properties, depending on whether they were produced at the start or at the end of a batch. Frequently segregation also takes place during the storage of a mixture of feature substances, in particular if storage takes place in the form of a dispersion, such as for example a printing ink. Consequently, it has to be verified regularly through quality checks whether segregation or partial segregation has unintentionally led to the inhomogeneity and uselessness of the mixture.

If feature substances are provided in the shape of a certain pattern, for example form a luminescent coding, so far the only possibility has been to print the feature substance or the mixture of feature substances on the surface of a security element or of a document of value in the shape of the desired pattern, for example of the coding. A direct integration into the volume of a document of value or of a security element in the form of a defined arrangement, or the creation of a defined arrangement of the feature substances on the surface of a document of value or of a security element by any methods other than printing has so far been impossible. In the production of codings an inhomogeneity of mixtures of feature substances caused by partial segregation represents a particularly serious problem, since it can lead to an incorrect or unreadable coding.

It is therefore the object of the present invention to provide a combination of feature substances having at least two different substances forming a non-segregating system.

The combination of feature substances is to be adapted to be provided preferably also by methods other than printing in the shape of a pattern on or in a document of value or security element.

It is also the object of the present invention to provide a method for producing such a combination of feature substances.

It is furthermore the object of the present invention to provide a method for securing the authenticity of a document of value or security element by means of such a combination of feature substances.

It is in addition the object of the present invention to provide a security element or a document of value having at least one authenticity feature on the basis of such a combination of feature substances.

BRIEF SUMMARY

The inventive combination of feature substances has at least one luminescent substance, which is excitable by radiation in the infrared and/or visible and/or ultraviolet spectrum to emit luminescence, preferably emit fluorescence. Furthermore, the inventive combination of feature substances has nanoparticles which are bound to the surfaces of the luminescent substance particles by adhesive forces. The adhesion is sufficiently strong that during storage and processing no segregation of the luminescent substance and the nanoparticles takes place, at least not to an extent which interferes with the production of security features. Also during storage in the form of a dispersion no segregation has to be feared.

The inventive combination of feature substances consequently represents a "composite feature substance", which is formed by at least two different substances, but behaves like one single feature substance. The properties of the composite feature substance represent a combination of the properties of the luminescent substance and the nanoparticles.

Therein a "combination" can be a mere additive combination and/or an influencing of the properties.

The invention makes use of a phenomenon which is used similarly for stabilizing emulsions and in suspension polymerization.

DETAILED DESCRIPTION OF PREFERRED EMBODIMENTS OF THE INVENTION

In 1907 Pickering discovered that oil-water emulsions can be stabilized by colloids that aggregate spontaneously on the interfaces of the droplets. In the so-called "Pickering emulsions" tiny solid particles act as emulsifiers, i. e. surfactant-free emulsion systems can be produced. The solid particles arrange at the oil-water interface and form a dense package enveloping the droplets of the emulsion. This solid-particle network represents a mechanical barrier preventing the coalescence of the droplets and thus stabilizes the emulsion.

The precondition for solid particles to act as "Pickering emulsifiers" is that the particle size is smaller than the desired droplet size by at least factor 10, and that the solid substance is wetted by the oil phase and the aqueous phase, but has a different affinity to the two phases. In chemical process engineering Pickering emulsifiers are used in suspension polymerization as stabilizers to prevent the sticking together of the growing suspension particles. The Pickering emulsifiers arrange at the interface between the suspension particles and liquid phase, envelop the suspension particles and thus prevent their coalescence. The first precondition for the operating principle as a Pickering emulsifier is that the emulsifier is insoluble in the liquid phase and is substantially smaller than the suspension particle to be stabilized. The precondition for the accumulation process in the interface between the phases is a suitable interaction force, i. e. adhesion between the suspension particle to be stabilized and the Pickering emulsifier, but simultaneously also a sufficiently good wettability of the Pickering emulsifier by the surrounding liquid.

Surprisingly, it was now found that substances of the type of the Pickering emulsifiers can under certain circumstances be used for producing feature substances for securing the authenticity of documents of value, wherein it is possible to obtain feature substances with properties that could so far not be achieved.

According to the invention luminescent substance particles are enveloped by nanoparticles, wherein typically a nanoparticle monolayer is formed, in which the nanoparticles form a dense packing. However, also a partial, preferably extensive envelope can be sufficient. The luminescent substance particles have an average particle size of approximately 1 to 100 μm. The volumes of the nanoparticles are smaller than the volumes of the luminescent substance particles by at least one order of magnitude, preferably 2 to 3 orders of magnitude.

By enveloping a core of a luminescent substance particle by nanoparticles different feature substances become one single feature substance, consisting of a core and of an envelope. Consequently, the inventive feature substance is actually a system of feature substances whose properties result from the combination of the properties of the individual components.

The luminescent substances usable for producing the inventive feature substances are not limited in any way. Generally, all substances, in particular luminescent substances, are suitable, which can be excited to emission, in particular luminescence emission, by irradiation with light in the infrared and/or visible and/or ultraviolet spectrum. The emission or luminescence emission takes place preferably also in the infrared and/or visible and/or ultraviolet spectrum. The luminescent substances are preferably fluorescent substances.

As examples for suitable luminescent substances host lattices doped with rare earth metals, for example with ytterbium, praseodymium, neodymium, etc., doped garnets or perovskites can be quoted, also phosphorus compounds such as phosphorus sulfides, oxides, selenides with traces of heavy metals such as silver, copper, manganese or europium are suitable. However, these examples represent mere indications and are not to be understood to be limiting in any way. Furthermore also organic luminescent substances can be used, for example rhodamines, perylenes, isoindolinones, quinophthalones and oxazinones. Methods for producing the luminescent substances are known to the person skilled in the art. Production methods are for example described in WO 81/03508 A1. Many luminescent substances are also commercially available, for example Paliosecure Gelb by BASF, and Cartax by Clariant.

For forming the envelope around the luminescent substance particles in principle all solid substances are suitable which can be reduced to sufficiently small particles, which attach to the luminescent substance particles in the reduced state, i. e. as nanoparticles, and which either have feature-substance properties themselves or at least modify the luminescent properties of the luminescent substance.

Substances which modify the luminescent properties of the luminescent substance are for example such substances which absorb in certain wavelength ranges in which the luminescent substance emits, and thus change the luminescence spectrum. An example for such a combination is the example 9 of the above-referenced WO 81/03508 A1 as luminescent substance, and nano-scale $Fe_3O_4$ as nanoparticle substance.

Furthermore as nanoparticles also luminescent substances can be used, thus in principle the same substances which are suitable also for forming the core of the inventive feature substance. A combination of different luminescent substances results in an overlapping luminescence spectrum.

However, preferably for the envelope of nanoparticles such substances are used which have a machine-detectable feature differing from the detectable feature of the core material, for example magnetic or magnetizable substances, electrically conductive substances and semiconductors. These substances have to be stable in the application medium; for example nano-scale iron is instable in water, but after wetting with water turns into an not strictly definable magnetic oxide (nano-scale metals are as a rule pyrophoric). When selecting the materials it has to be kept in mind that they must not absorb strongly in spectrums which are essential for identifying the luminescence spectrum. The luminescence spectrum must not be influenced by the nanoparticles to an interfering extent. The question of how strong a change may be so as not to be regarded as an interfering influence, essentially depends on the intended use. In some cases a change or weakening of the luminescence spectrum and/or the absorption spectrum can actually be desirable to render an identification more difficult.

An example for a nanoparticle material are carbon nano tubes (CNTs). CNTs are microscopically small tube-shaped structures of carbon. In the walls of the tubes the carbon is $sp^2$ hybridized and forms a honeycomb structure like in the layers of graphite. The diameter of the tubes is mostly in a range of 1 to 50 nm, but also smaller tubes can be produced. The length of the individual tubes can be up to several millimeters. Several single-walled carbon nano tubes (SW- CNT) can be disposed inside each other concentrically, so that multi-walled carbon nano tubes are given. Depending on the exact structure, the electrical conductivity within one tube can be metallic or semi-conducting.

CNTs are commercially available (e. g. from MER Corporation or NanoLab Inc.) and can be reduced to the necessary dimensions by conventional reduction procedures such as milling.

Further examples for nanoparticle materials combinable with luminescent materials to form inventive feature substances are nano α-iron, nano $Fe_3O_4$ and nano $NiFe_2O_4$. The feature substances with nano α-iron, nano $Fe_3O_4$ and with nano $NiFe_2O_4$ are luminescent and magnetic.

In the following some non-restrictive examples of two-component combinations of a luminescent substance with nano powders are listed. Example 9 of the above-referenced WO 81/03508 A1 as a luminescent substance, with MWCNT (particle size 20-50 nm),
MWCNT (particle size 20-30 nm),
MWCNT (particle size 40-70 nm),
nano a-iron (APS 25 nm),
nano $Fe_3O_4$ (APS 20-30 nm), or
nano $NiFe_2O_4$ (APS 20-30 nm).

APS refers to the tube diameter of the carbon tubes. The materials are for example available from MER Corporation.

The average particle sizes of the nano powders can be in the range of approximately 1 to 1000 nm, wherein the optimal particle sizes also depend on the size of the luminescent substance particles. The luminescent substance particles typically have an average particle size in a range of approximately 1 to 100 μm, and the nanoparticles are smaller by 1, preferably 2 to 3 orders of magnitude. Preferred average particle sizes for the nano powders are in a range of 1 to 500 nm, particularly preferred 10 to 100 nm.

The weight ratios of luminescent substance and nano particle material depend on the type and the particle size of the materials. Furthermore they depend on the exact characteristics of the desired feature substance, i. e. whether a feature substance is required whose luminescent substance particles are preferably optimally surrounded by a nanoparticle envelope, whether also a partial envelope is regarded as sufficient, or whether, if required, also free (non-enveloped) luminescent substance particles are to be present. If a feature substance is desired that consists of luminescent substance particles that are preferably completely enveloped by nanoparticles, but does not contain any free luminescent substance particles and no free nanoparticles, the weight ratio of the luminescent substance to the nano powder typically lies in the range of about 1:1.

However, the weight ratios can also vary within a much larger range, approximately from 100:1 to 1:100; preferably approximately 5:1 to 1:3, in particular if the inventive feature substance contains additional free luminescent substances and/or nanoparticles. If such additives are used it has to be checked in prior tests, whether the resulting system is stable against segregation.

The inventive feature substance is not limited to combinations of a type of luminescent substance with a type of nanoparticle. Rather, two or more different luminescent substances and/or two or more different nanoparticles can be combined with each other. In this way it is for example possible to obtain a luminescent substance which is also magnetic and electrically conductive.

The detection of the combined properties of the inventive feature substance takes place in the same way as the conventional detection of the luminescent properties, the magnetic properties and the electrically conductive properties of the individual feature substances. The required spectrometers, checking devices for luminescence or magnetism and conductivity meters are commercially available.

The production of an inventive feature substance takes place in a very simple manner, by adding the luminescent substance or the luminescent substances and a material in the form of a nano powder, or, if required, several different nano-powder materials, to a dispersant and mixing them for such a time until a dispersion is obtained. The dispersion can be used as such, but preferably the feature substance is separated from the dispersion, usually by filtering, and dried.

As dispersant preferably water is used. The source materials, in particular the nano powder, are dispersible therein only with difficulty, but in the course of time a growing number of nanoparticles are bound to the surfaces of the luminescent substance particles through adhesion, and if no surplus of nanoparticles is present, finally a dispersion of the feature substance is obtained, in which no nanoparticle “clusters” are contained any more. The association of the nanoparticles to the luminescent substance particles takes several hours. The association is preferably carried out at room temperature, but the temperature can also be raised slightly, however wherein a warming only rarely results in an acceleration of the association of the nanoparticles to the luminescent substance particles. The drying of the feature substance filtered out of the dispersion preferably takes place at an elevated temperature, wherein the temperature depends on the chosen dispersant. If water is used as dispersant, the drying preferably takes place at approximately 110° C.

In the case of filtration the dispersed nanoparticles are not held back by conventional standard filters. They can at best be retained by special filters. Thus, if a feature substance is to be produced that consists of luminescent substance particles whose surfaces are preferably fully enveloped by nanoparticles, however wherein no free nanoparticles are to be present any more, production can take place in a simple manner by using a substantial surplus amount of nano powder, stirring for a sufficient time (approximately 10 hours) and subsequently filtering. Nanoparticles not bound to the luminescent substance particles in the form of a coating, pass the filter or, depending on the density, float on the surface of the dispersion, whereas the feature substance sinks and later remains on the filter. If any nanoparticle clusters are left in the dispersion, which are also retained by the filter, remedy is provided by careful comminuting and washing after with dispersant or prior skimming (e.g. in the case of specifically lighter MWCNTs or large-volume inclusions of air of the nano-scale oxides).

The inventive feature substances are hybrid products of the source components both regarding their properties (luminescence, magnetism, electrical conductivity), and their appearance, such as e. g. their color. If for example a white or transparent luminescent substance is coated with a black or a brown nano powder, the result is a homogeneous feature substance power of a grey or light brown color.

The inventive feature substance is used for securing the authenticity of documents of value or security elements.

Documents of value and security elements respectively consist of at least one layer of a carrier material and possibly further layers. Furthermore they have at least one authenticity feature formed by one or several feature substances. In contrast to a document of value, a security element is not brought into circulation as such, but in connection with a document of value, on which it is applied or in which it is integrated.

The inventive security elements and documents of value have at least one authenticity feature formed by an inventive feature substance.

Regarding its possible application, the inventive feature substance does not differ from conventional luminescent substances. It can for example be integrated in the volume or in partial areas of the volume of a security element or document of value; wherein the carrier material can consist of paper or plastic. Alternatively, the feature substance can be provided in the form of a coating on at least one surface or on partial areas of at least one surface of a security element or document of value.

As a further alternative the feature substance can be contained in a printing ink, which is printed on a security element or document of value. The inventive feature substance is used respectively in such concentrations that are usual for luminescent materials in the individual application field, i. e. approximately 0.05 to 1 weight-%, if the feature substance is contained in the volume of a paper layer, and approximately 10 to 40 weight-%, if the feature substance is contained in a printing ink.

Security elements with the inventive feature substance are preferably security threads, mottling fibers, planchets or labels which are integrated in the volume of a carrier material of a value document, or are stuck to a surface of the carrier material or a different layer of a document of value.

To produce a security element the inventive feature substance can for example be rubbed into a lacquer, which is then extended to form a lacquer film and cut to a size fitting a security element. A suitable lacquer is a polyamide lacquer, and suitable concentrations are in a range of approximately 0.1 to 1 weight-%.

A special advantage of the inventive feature substances becomes obvious if an inventive feature substance is to be provided in a defined distribution, if the feature substance is to form a code for example. In such a code, areas with a high concentration of the feature substance alternate in a predetermined manner with areas with a lower concentration of the feature substance, or completely without the feature substance. The arrangement of the areas with a high concentration of the feature substance and with a low concentration of the feature substance (or without the feature substance) is machine-readable. So far such codes could be produced only by printing luminescent substances in a certain pattern. They could not be formed directly in the volume of a document of value.

However, the inventive feature substances have the special characteristic that they do not only have luminescent features, but that they are preferably also magnetic or magnetizable or electrically conductive. In an electrical or magnetic field the nanoparticles of the envelope of the luminescent substance particles align with the field, and the feature substance has the tendency to migrate within this field. The precondition for such an alignment and possibly migration is that the surrounding medium of the feature substance is sufficiently liquid in order to allow a movement of the feature substance. In practice this means that the inventive feature substance can be oriented or moved in a desired manner within a carrier material or a printing ink by applying a suitable magnetic or electrical field, as long as the carrier material is still sufficiently soft or wet, or the printing ink is still sufficiently liquid. A pattern of areas with a high concentration of the feature substance and areas with a low concentration of the feature substance in a paper layer can for example be produced in that an inventive feature substance with luminescent and magnetic properties is integrated in the humid paper in the paper machine, while an arrangement of magnets in the desired code pattern is arranged at the paper. The magnetic nanoparticles of the feature substance then orient themselves in the humid paper mass, and the feature substance particles migrate toward the magnets, whereby they reproduce the arrangement pattern of the magnets, thus the code. The code can be read out e. g. spectrometrically.

In the following a general production procedure for an inventive feature substance is specified.

2 g of the above-mentioned example 9 of WO 81/03508 A1, and 1.5 g MWCNT nano powder are weighed out into a beaker with approximately 50 ml water and are stirred at room temperature for one day. At the beginning of the mixing process the nano powder floats on top and partly forms big clusters. Once the hardly dispersible nano powder is finely dispersed in the dispersion thus produced, the material is filtered. The nano material does not penetrate the filter through the filter pores. The filtered material is dried at 110° C. for example over night.

Subsequently, the thus obtained material can for example be integrated in the production of bank note paper, e. g. at a dosage of 0.4 weight-%.

Likewise the material can be rubbed into a polyamide lacquer and the lacquer can be extended to form a lacquer film, wherein the concentration of the feature substance also amounts to 0.4 weight-% for example. The lacquer film is suitable for sticking onto bank notes.

The authenticity of the bank note can now be verified both by measuring the infrared luminescence and by measuring the electrical conductivity determined by the nano powder. Of course the authenticity can also be established by measuring both features.

Instead of the example specified, also the nano powders mentioned above in connection with WO 81/03508 A1 can be used. Likewise, other luminescent substances can be used.

The invention claimed is:

1. A security element or document of value comprising a feature substance;

- wherein the feature substance is applied on at least partial areas of at least one surface of the security element or document of value, or the feature substance is integrated in at least one partial area of the volume of the security element or document of value;
- wherein the feature substance is configured for securing the authenticity of documents of value, the feature substance comprising at least one luminescent substance in particle form, the at least one luminescent substance being excitable by radiation in at least one of the infrared, visible and ultraviolet spectrum to emit luminescence;
- wherein the particles of the luminescent substance are enveloped at least partially by nanoparticles;
- wherein the nanoparticles are bound to surfaces of the particles of the luminescent substance by adhesive forces;
- wherein the nanoparticles absorb in at least one wavelength range in which the luminescent substance emits, such that the luminescence spectrum of the feature substance results from the interaction of the luminescence emission properties of the luminescent substance and the absorption properties of the nanoparticles; and
- wherein the weight ratio of luminescent substance particles to nanoparticles is in the range of 10:1 to 1:10.

2. The security element or document of value comprising the feature substance according to claim 1, wherein the luminescent substance emits in at least one of the infrared, visible and ultraviolet spectrum.

3. The security element or document of value comprising the feature substance according to claim 1, wherein the particles of the luminescent substance are enveloped substantially completely by a monolayer of the nanoparticles.

4. The security element or document of value comprising the feature substance according to claim 1, wherein the luminescent substance is selected from luminescent substances on the basis of host lattices doped with at least one rare earth metal.

5. The security element or document of value comprising the feature substance according to claim 1, wherein the luminescent substance includes an organic luminescent substance.

6. The security element or document of value comprising the feature substance according to claim 1, wherein the particles of the luminescent substance have an average particle size in the range of 1 to 100 μm.

7. The security element or document of value comprising the feature substance according to claim 1, wherein the nanoparticles include magnetic materials, magnetizable materials, electrically conductive materials, semiconductor materials, or mixtures thereof.

8. The security element or document of value comprising the feature substance according to claim 1, wherein the nanoparticles include carbon nano tubes, nano α-iron, nano Fe3O4, nano NiFe2O4, or mixtures thereof.

9. The security element or document of value comprising the feature substance according to claim 1, wherein the nanoparticles have an average particle size in the range of 1 to 1000 nm.

10. The security element or document of value comprising the feature substance according to claim 1, including luminescent substance particles that are not enveloped by either nanoparticles or free nanoparticles, or by both nanoparticles and free nanoparticles.

11. The security element or document of value comprising the feature substance according to claim 1, including at least two different luminescent substances and at least two different types of nanoparticles.

12. The security element or document of value comprising the feature substance according to claim 1, further comprising an authenticity feature that comprises the feature substance applied to or integrated into a carrier material.

13. The security element or document of value according to claim 12, wherein the luminescent substance of the authenticity feature emits in at least one of the infrared, visible, and ultraviolet spectrum.

14. The security element or document of value according to claim 12, wherein the particles of the luminescent substance of the authenticity feature have an average particle size in the range of 1 to 100 μm.

15. The security element or document of value according to claim 12, wherein the nanoparticles of the authenticity feature include magnetic materials, magnetizable materials, electrically conductive materials, semiconductor materials, or mixtures thereof.

16. The security element or document of value according to claim 12, wherein the nanoparticles of the authenticity feature further include at least one of nano α-iron, nano Fe3O4, nano NiFe2O4, or mixtures thereof.

17. The security element or document of value according to claim 12, wherein the nanoparticles of the authenticity feature have an average particle size in the range of 1 to 1000 nm.

18. The security element or document of value according to claim 12, wherein the weight ratio of luminescent substance particles to nanoparticles of the authenticity feature is in the range of 10:1 to 1:10.

19. The security element or document of value according to claim 12, including luminescent substance particles of the authenticity feature that are not enveloped by either nanoparticles or free nanoparticles, or by both nanoparticles and free nanoparticles.

20. The security element or document of value according to claim 12, including at least two different luminescent substances and at least two different types of nanoparticles.

21. A method for securing the authenticity of a security element or document of value, the method comprising:

applying the feature substance according to claim 1 on at least partial areas of at least one surface of the security element or document of value, or integrating the feature substance according to claim 1, in at least one partial area of the volume of the document of value or security element.

22. The security element or document of value comprising according to claim 1, wherein the migration leads to a defined distribution of the feature substance particles that is machine-verifiable or visually verifiable.

23. The security element or document of value according to claim 1, further comprising at least one carrier material and, on or within the carrier material, at least one authenticity feature is provided based on the feature substance.

24. The security element or document of value according to claim 23, wherein the carrier material comprises paper or plastic.

25. The security element or document of value according to claim 23, wherein the feature substance is provided in the volume of the carrier material or in a layer applied on at least partial areas of a surface of the carrier material.

26. The security element or document of value according to claim 23, wherein the feature substance is present in a printing ink applied on a surface of the document of value or security element.

27. A security element or document of value comprising a feature substance;

wherein the feature substance is applied on at least partial areas of at least one surface of the security element or document of value, or the feature substance is integrated in at least one partial area of the volume of the security element or document of value;

wherein the feature substance is configured for securing the authenticity of documents of value, the feature substance comprising at least one luminescent substance in particle form, the at least one luminescent substance being excitable by radiation in at least one of the infrared, visible and ultraviolet spectrum to emit luminescence;

wherein the particles of the luminescent substance are enveloped at least partially by nanoparticles;

wherein the nanoparticles are bound to surfaces of the particles of the luminescent substance by adhesive forces;

wherein the nanoparticles absorb in at least one wavelength range in which the luminescent substance emits, such that the luminescence spectrum of the feature substance results from the interaction of the luminescence emission properties of the luminescent substance and properties of the nanoparticles;

wherein the security element or document of value is subjected to electrical or magnetic fields during the application or integration of the feature substance such that an orientation and/or a migration of the particles of the feature substance within the electrical or magnetic field takes place; and wherein the weight ratio of luminescent substance particles to nanoparticles is in the range of 10:1 to 1:10.

28. A security element or document of value comprising a feature substance;

wherein the feature substance is applied on at least partial areas of at least one surface of the security element or document of value, or the feature substance is integrated in at least one partial area of the volume of the security element or document of value;

wherein the feature substance is configured for securing the authenticity of documents of value, the feature substance comprising at least one luminescent substance in particle form, the at least one luminescent substance being excitable by radiation in at least one of the infrared, visible and ultraviolet spectrum to emit luminescence;

wherein the particles of the luminescent substance are enveloped at least partially by nanoparticles;

wherein the nanoparticles are bound to surfaces of the particles of the luminescent substance by adhesive forces;

wherein the nanoparticles absorb in certain wavelength ranges in which the luminescent substance emits, such that the luminescence spectrum of the feature substance results from the interaction of the luminescence emission properties of the luminescent substance and properties of the nanoparticles;

wherein the security element or document of value is subjected to electrical or magnetic fields during the application or integration of the feature substance such that an orientation and/or a migration of the particles of the feature substance within the electrical or magnetic field takes place; and wherein the weight ratio of luminescent substance particles to nanoparticles is in the range of 10:1 to 1:10.

* * * * *